United States Patent
Rasheed et al.

(10) Patent No.: US 7,818,956 B2
(45) Date of Patent: Oct. 26, 2010

(54) PULSE DETONATION ASSEMBLY AND HYBRID ENGINE

(75) Inventors: Adam Rasheed, Latham, NY (US);
Anthony John Dean, Scotia, NY (US);
Christian Lee Vandervort, Voorheesville, NY (US)

(73) Assignee: General Electric Company, Niskayuna, NY (US)

( * ) Notice: Subject to any disclaimer, the term of this patent is extended or adjusted under 35 U.S.C. 154(b) by 903 days.

(21) Appl. No.: 11/129,686

(22) Filed: May 13, 2005

(65) Prior Publication Data

US 2006/0254252 A1    Nov. 16, 2006

(51) Int. Cl.
*F02C 5/00* (2006.01)
*F02C 5/02* (2006.01)
*F02K 5/02* (2006.01)

(52) U.S. Cl. .................. 60/39.76; 60/247; 60/39.38

(58) Field of Classification Search .............. 60/39.01, 60/39.76, 39.37, 804, 39.38, 200.1, 247
See application file for complete search history.

(56) References Cited

U.S. PATENT DOCUMENTS

| | | | | |
|---|---|---|---|---|
| 2,579,321 A * | 12/1951 | Guercken | ............. | 60/39.39 |
| 2,834,181 A * | 5/1958 | Paris et al. | ............. | 60/225 |
| 2,942,412 A * | 6/1960 | Bollay | ............. | 60/247 |
| 5,345,758 A * | 9/1994 | Bussing | ............. | 60/39.38 |
| 6,308,740 B1 * | 10/2001 | Smith et al. | ............. | 137/892 |
| 6,442,930 B1 * | 9/2002 | Johnson et al. | ............. | 60/226.1 |
| 6,460,342 B1 * | 10/2002 | Nalim | ............. | 60/772 |
| 6,516,605 B1 | 2/2003 | Meholic | | |
| 6,550,235 B2 | 4/2003 | Johnson et al. | | |
| 6,666,018 B2 * | 12/2003 | Butler et al. | ............. | 60/226.1 |
| 6,877,310 B2 | 4/2005 | Leyva | | |
| 6,883,302 B2 | 4/2005 | Koshoffer | | |
| 6,889,505 B2 | 5/2005 | Butler et al. | | |
| 6,981,365 B1 * | 1/2006 | Johnson | ............. | 60/247 |
| 7,228,683 B2 * | 6/2007 | Henry | ............. | 60/204 |
| 2002/0059793 A1 * | 5/2002 | Kaemming et al. | ............. | 60/204 |
| 2004/0058191 A1 * | 3/2004 | Narasimhan et al. | ............. | 428/680 |
| 2005/0130084 A1 * | 6/2005 | Aarnio et al. | ............. | 431/1 |
| 2007/0028593 A1 * | 2/2007 | Guo | ............. | 60/204 |

* cited by examiner

*Primary Examiner*—Devon C Kramer
*Assistant Examiner*—Gerald L Sung
(74) *Attorney, Agent, or Firm*—Penny A. Clarke (57) ABSTRACT

A pulse detonation (PD) assembly includes a number of PD chambers adapted to expel respective detonation product streams and a number of barriers disposed between respective pairs of PD chambers. The barriers define, at least in part, a number of sectors that contain at least one PD chamber. A hybrid engine includes a number of PD chambers and barriers. The hybrid engine further includes a turbine assembly having at least one turbine stage, being in flow communication with the PD chambers and being configured to be at least partially driven by the detonation product streams. A segmented hybrid engine includes a number of PD chambers and segments configured to receive and direct the detonation product streams from respective PD chambers. The segmented hybrid engine further includes a turbine assembly configured to be at least partially driven by the detonation product streams.

25 Claims, 12 Drawing Sheets

PULSE DETONATION ASSEMBLY AND HYBRID ENGINE

STATEMENT REGARDING FEDERALLY SPONSORED RESEARCH & DEVELOPMENT

This invention was made with Government support under contract number NAS 3-01135 awarded by the National Aeronautics and Space Administration (NASA). The Government has certain rights in the invention.

BACKGROUND

The invention relates generally to pulse detonation assemblies, and more particularly, to hybrid pulse detonation-turbine engines.

Pulse detonation engines are a promising propulsion technology, in view of the lower entropy rise of detonative processes, as compared to constant pressure deflagration. Consequently, pulse detonation engines have the potential to propel vehicles at higher thermodynamic efficiencies than are achieved with deflagration-based engines.

Recently, hybrid pulse detonation-turbine engines have been proposed, where the steady flow constant pressure combustor is replaced with a number of pulse detonation chambers. See, for example, U.S. Pat. No. 6,666,018, Butler et al., entitled "Combined cycle pulse detonation turbine engine" and U.S. Pat. No. 6,442,930, Butler et al., entitled "Combined cycle pulse detonation turbine engine." Although specific concepts vary in their implementation, a common feature incorporates the idea of the exhaust from the multiple pulse detonation chambers driving a downstream turbine.

One challenge in optimizing multi-tube pulse detonation assemblies is designing the downstream geometry. The downstream geometry affects performance in several ways. For example, in multi-tube pulse detonation assemblies, the downstream shock interactions of one tube (chamber) may adversely affect the operability of neighboring chambers. In particular, the shock may propagate up an adjacent chamber, thereby disturbing the fill cycle of that chamber. This undesirable interaction is particularly relevant for hybrid pulse detonation-turbine applications, where there may be a strong shock reflection from the turbine face.

Another challenge for hybrid pulse detonation-turbine assemblies is reducing flow losses prior to work extraction by a downstream turbine. Consequently, controlling the geometry of the transition region from the pulse detonation chamber to the turbine inlet is critical to reducing flow losses.

Accordingly, it would be desirable to provide a pulse detonation assembly and hybrid pulse detonation-turbine engine that reduce undesirable interactions between neighboring pulse detonation chambers. It would further be desirable to reduce the expansion losses of the high pressure gases discharging from the pulse detonation chamber.

BRIEF DESCRIPTION

One embodiment of the present invention resides in a pulse detonation assembly. The pulse detonation assembly includes a number of pulse detonation chambers. Each of the pulse detonation chambers is adapted to expel a respective detonation product stream. The pulse detonation assembly further includes a number of barriers. Each of the barriers is disposed between a pair of pulse detonation chambers. The barriers define, at least in part, a number of sectors. Each of the sectors includes at least one of the pulse detonation chambers.

Another embodiment of the present invention resides in a hybrid engine. The hybrid engine includes a number of pulse detonation chambers. Each of the pulse detonation chambers is adapted to expel a respective detonation product stream. The hybrid engine further includes a number of barriers. Each of the barriers is disposed between a pair of the pulse detonation chambers. The barriers define, at least in part, a number of sectors. Each of the sectors contains at least one of the pulse detonation chambers. The hybrid engine further includes a turbine assembly having at least one turbine stage and being in flow communication with the pulse detonation chambers. The turbine assembly is configured to be at least partially driven by the detonation product streams from the pulse detonation chambers.

Another embodiment of the present invention resides in a segmented hybrid engine. The segmented hybrid engine includes a number of pulse detonation chambers. Each of the pulse detonation chambers is adapted to expel a respective detonation product stream. The segmented hybrid engine further includes a number of segments. Each of the segments is configured to receive and direct the detonation product stream from a respective one of the pulse detonation chambers. The segmented hybrid engine further includes a turbine assembly having at least one turbine stage and being in flow communication with the pulse detonation chambers. The turbine assembly is configured to be at least partially driven by the detonation product streams from the pulse detonation chambers.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

A pulse detonation assembly 100 embodiment of the invention is described with reference to FIGS. 1 and 2. As shown for example in FIG. 1, the pulse detonation assembly 100 includes a number of pulse detonation chambers 10. Each of the pulse detonation chambers 10 is adapted to expel a respective pressure-rise combustion (or "detonation") product stream. The pulse detonation assembly 100 further includes a number of barriers 20, where each of the barriers 20 is disposed between a respective pair of pulse detonation chambers 10, as indicated for example in FIG. 2. As shown for example in FIGS. 1 and 2, the barriers 20 define, at least in part, a number of sectors 30, where each of the sectors 30 contains a respective one of the pulse detonation chambers 10. For the exemplary embodiment shown in FIGS. 1 and 2, the barriers 20 and casing 50 define the sectors 30.

As used herein, a "pulse detonation chamber" (or "PD" chamber) is understood to mean any combustion device or system where a series of repeating detonations or quasi-detonations within the device cause a pressure rise and subsequent acceleration of the combustion products as compared to the pre-burned reactants. A "quasi-detonation" is a combustion process that produces a pressure rise and velocity increase higher than the pressure rise produced by a deflagration wave. Typical embodiments of PD chambers include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out the PD chamber exhaust to produce a thrust force. As known to those skilled in the art, pulse detonation may be accomplished in a number of types of detonation chambers, including detonation tubes, shock tubes, resonating detonation cavities and annular detonation chambers.

According to a more particular embodiment, the barriers 20 are formed of high temperature materials to withstand the high temperatures associated with the operation of the pulse detonation chambers 10 and associated products. For example, the barriers 20 may be formed from alloys typically used for gas turbine components, including advanced turbine materials, such as Nickel alloy metals or ceramic matrix composites (CMCs). The barriers 20 may be single wall or multi-wall structures and may include coatings, such as thermal barrier coatings (TBCs), anti-oxidation coatings, or other coatings typically used on hot gas path components. In order to reduce their cost and weight, the barriers 20 may be formed from a number of materials. For example, different materials may be employed upstream and downstream of the mixing zones 72. For example, lower temperature materials such as stainless steel may be employed upstream of the mixing zones, with higher temperature materials and/or additional hot gas path coatings being used for the downstream portion of the barrier 20 to withstand the hot detonation products. For this embodiment, axial transitions are employed between different materials.

Figure 1:
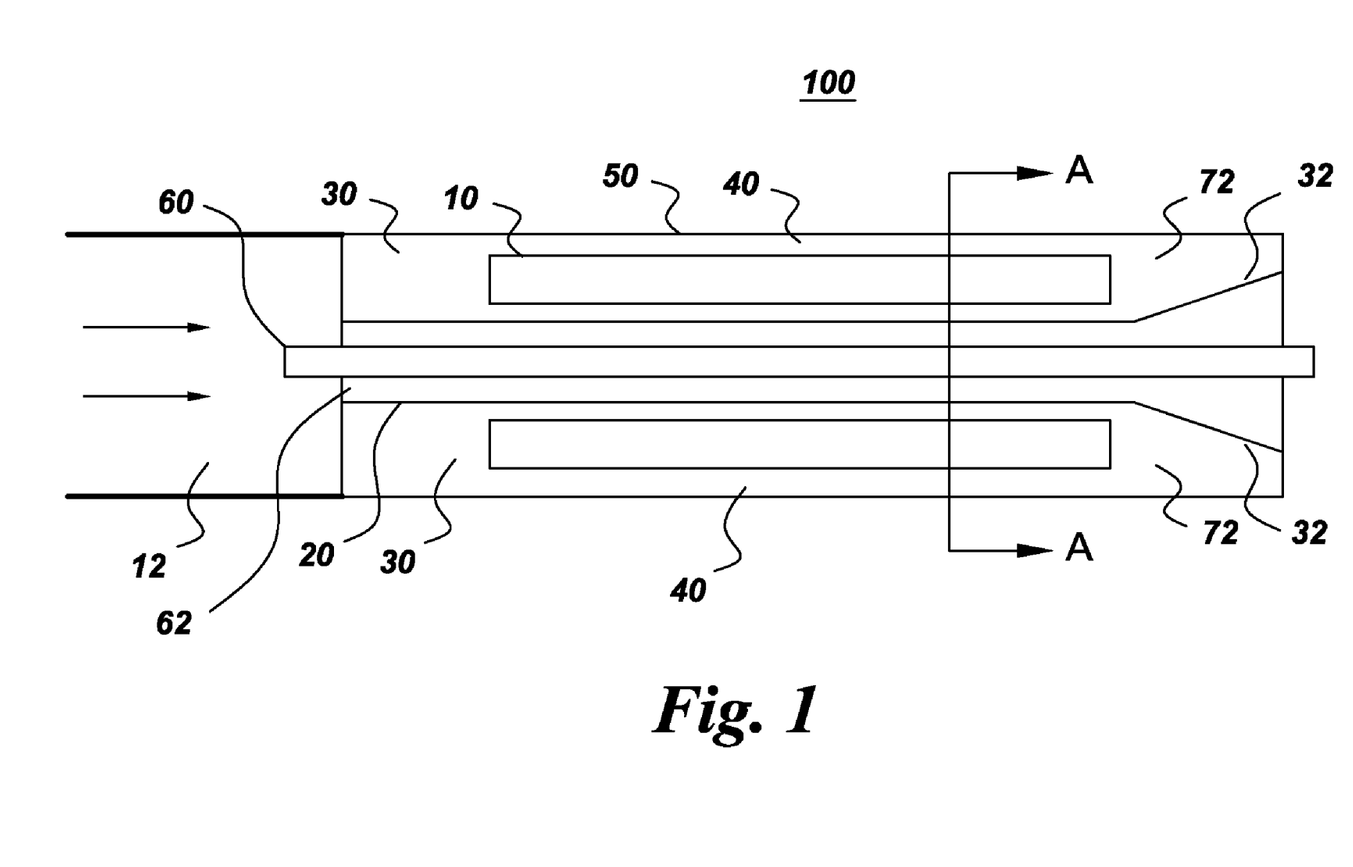
FIG. 1 depicts an exemplary pulse detonation assembly embodiment of the invention.
Figure 2:
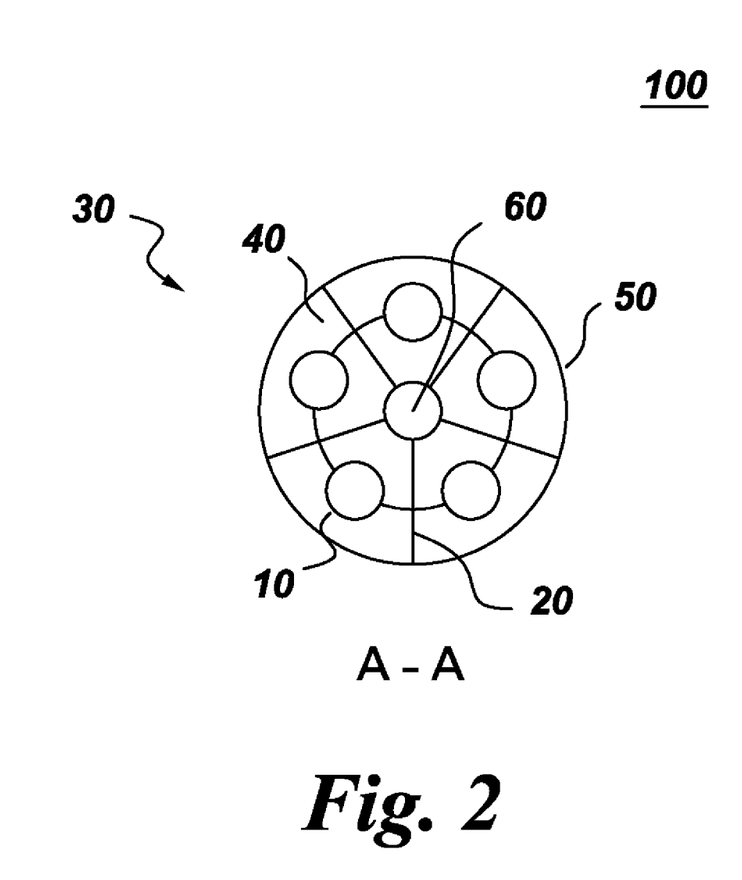
FIG. 2 is a cross-sectional view of the pulse detonation assembly of FIG. 1 taken along the line A-A.

For the exemplary embodiment shown in FIGS. 1 and 2, the pulse detonation assembly 100 further includes a casing 50. As shown, the pulse detonation chambers 10 are arranged in an annular configuration, and each of the barriers 20 extends between a central region 62 and the casing 50. The pulse detonation assembly 100 further includes a shaft 60 positioned in the central region 62, where each of the barriers 20 extends between the shaft and the casing 50. For the exemplary embodiments shown in FIGS. 1 and 2, each of the sectors 30 contains one pulse detonation chamber 10. However, for another embodiment (not shown), at least one of the sectors 30 contains at least two pulse detonation chambers 10. For the exemplary embodiment depicted in FIG. 1, the pulse detonation assembly 100 further includes a number of segments 32. Each of the segments 32 is configured to receive and direct the detonation product stream from a respective one of the pulse detonation chambers 10. For the particular embodiment shown in FIG. 1, each of the sectors 30 comprises a respective one of the segments 32. For the exemplary embodiment shown in FIG. 11, for example, each of the segments 32 is attached to a respective one of the pulse detonation chambers 10.

Figure 6:
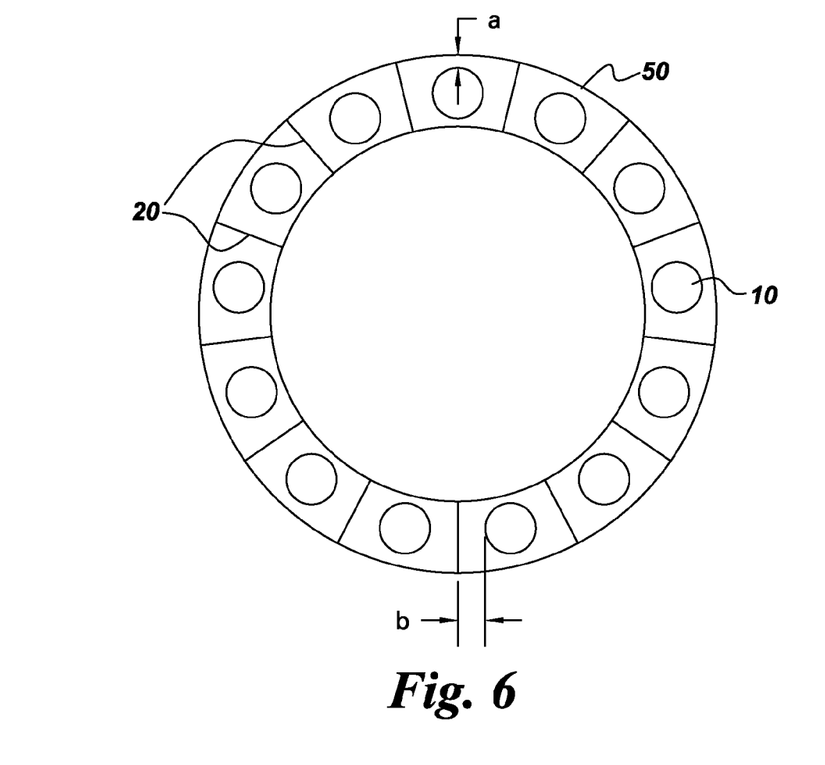
FIG. 6 shows exemplary dimensions for the segments of the pulse detonation assembly of FIG. 1 and the hybrid engine embodiment of FIG. 3.

As indicated for example in FIGS. 1 and 2, each of the sectors 30 defines a respective bypass region 40 adapted to receive and conduct a bypass flow. Exemplary spacing between the pulse detonation chambers 10 and the casing 50 $a$ relative to the spacing between the pulse detonation chamber 10 and the barrier 20 $b$ is a<~b. The dimensions a and b are indicated in FIG. 6.

For the exemplary embodiment illustrated by FIG. 1, pulse detonation assembly 100 further includes a number of segments 32, each of the segments 32 being provided for a respective one of the sectors and including a respective mixing zone 72 adapted to receive and mix the detonation product streams and the bypass flows from the respective sector 30 to form a segment exhaust flow. Each of the segments 32 is adapted to direct the segment exhaust flow, for example, toward a downstream unit 80, such as the first rotating stage of a turbine for a hybrid pulse detonation-turbine assembly 100, where the pulse detonation chambers 10 replace the conventional combustor (not shown). For the exemplary embodiment illustrated in FIG. 1, the segments are shaped end pieces 32. In one embodiment, the segments 32 are integral to the respective sectors 30. The segments 32 can be formed separately and then joined to the sectors 30, using suitable joining techniques, such as brazing or welding. Alternatively, the segments 32 and sectors 30 can be formed as a single piece. For the exemplary embodiment illustrated in FIG. 11, the segments are attached to PD chambers 10. Detonation products are extremely hot, and application of local hot streaks to turbine components, such as turbine disks, is undesirable in that the associated thermal stresses would shorten the component lifetime. Thus, one challenge associated with development of a commercially viable hybrid pulse detonation-turbine engine is to reduce the hot streaks applied to the turbine components. By mixing the hot detonation products with the cooler bypass air, the application of local hot streaks to components of a downstream unit 80, such as a turbine nozzle and disk, are reduced, thereby enhancing the lifetime of the downstream components.

Figure 7:
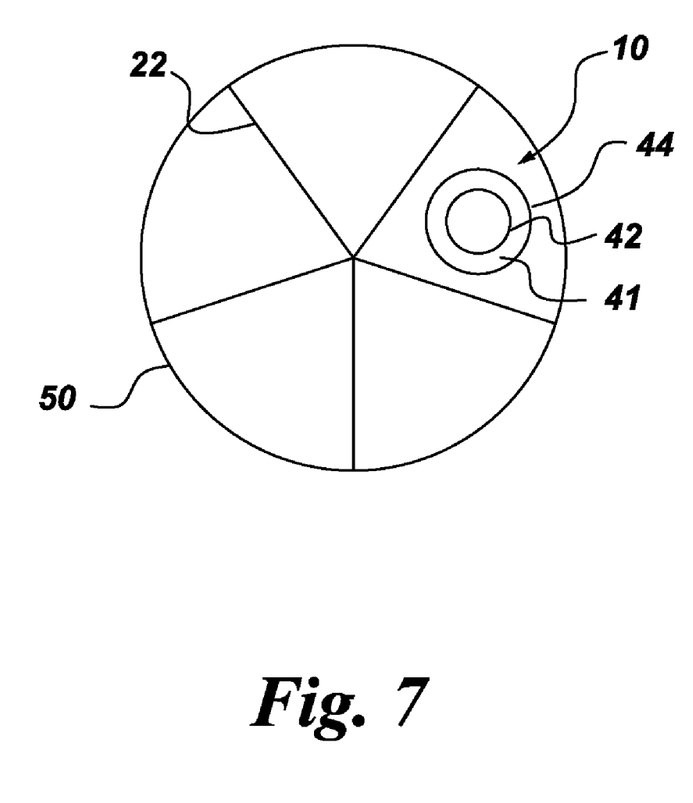
FIG. 7 shows an exemplary pulse detonation assembly embodiment of the invention with coaxial bypass flow.

FIG. 7 illustrates another embodiment configured for coaxial bypass flow. For the exemplary embodiment illustrated in FIG. 7, each of the pulse detonation chambers 10 has a coaxial wall structure comprising an inner and an outer wall 42, 44. As indicated, the inner wall 42 and outer wall 44 define a respective coaxial bypass region 41 adapted to receive and conduct a bypass flow. For the exemplary embodiment illustrated in FIGS. 7 and 11, the pulse detonation assembly 100 further includes segments 32. Each of the segments 32 is adapted to receive and mix the detonation product stream and the bypass flow from the respective pulse detonation chamber 10 and coaxial bypass region 41.

Air can be supplied to pulse detonation chambers 10 and bypass regions 40 in a number of ways. For the exemplary embodiment of FIG. 1, the pulse detonation assembly 100 further includes a plenum 12 configured to supply a primary air flow to the pulse detonation chambers 10 and the bypass flow to bypass regions 40. As used herein the term "air" should be understood to mean an oxidizer. For example and without limitation, "air" can be oxygen and/or compressed air. One benefit of this common plenum 12 configuration is the equal flow distribution between the bypass and core regions. Similarly, air may be supplied to the pulse detonation chambers 10 and bypass regions 40 via two or more separate plenums (not shown).

Figure 5:
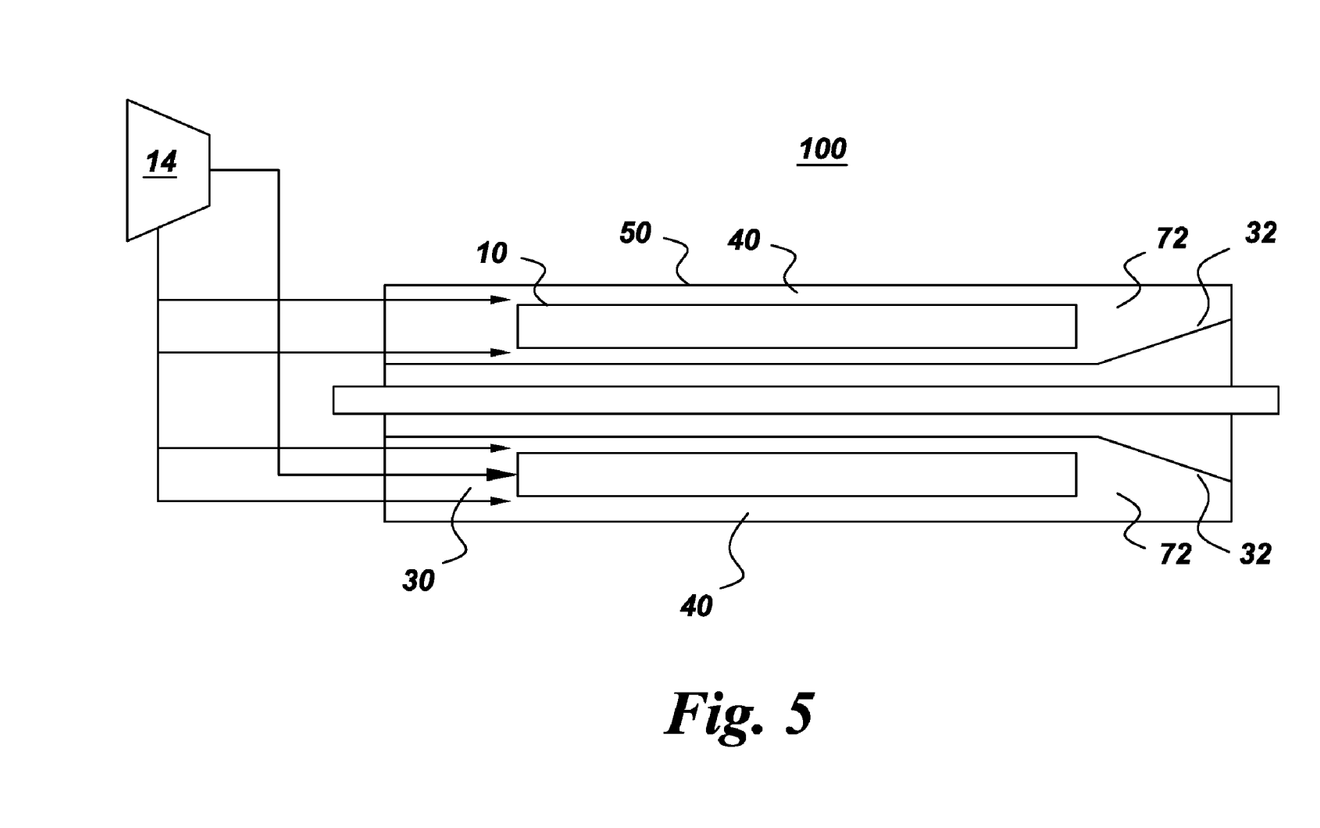
FIG. 5 shows the pulse detonation assembly of FIG. 1 with a compressor to supply both the primary and bypass air flows.

For the exemplary embodiment depicted in FIG. 5, the pulse detonation assembly 100 further includes a compressor 14, for example, a boost compressor, configured to supply a primary air flow to the pulse detonation chambers 10 and to supply the bypass flow to bypass regions 40. For example, compressed air may be supplied to the pulse detonation chambers 10, while lower compression air is bled off the compressor 14 to supply the bypass flow. One benefit of the use of a boost compressor is the ability to modulate the bypass flow for additional cooling of the pulse detonation assembly and/or downstream unit (e.g., turbine) or to provide additional airflow to the downstream unit, when needed. According to another embodiment, different sources supply the air flow to the core and bypass regions.

Figure 9:
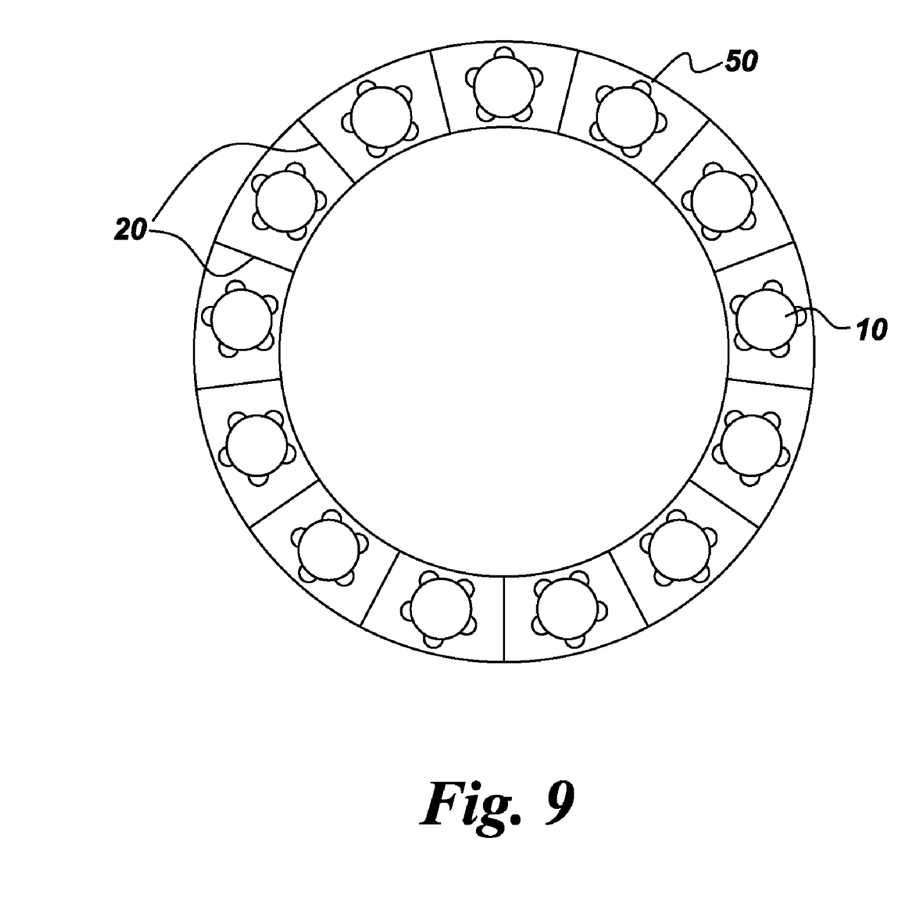
FIG. 9 illustrates in cross-sectional view taken along the line A-A in FIG. 1, an exemplary pulse detonation assembly embodiment where the walls of the PD chambers are curved.

As shown for example in FIG. 2, the PD chamber 10 walls are straight for certain embodiments. For the exemplary embodiment illustrated by FIG. 9, however, the PD chamber walls are curved. (For example, the PD chamber 10 walls 20 may form lobed mixers as shown. In another example shown in FIG. 12, the PD chamber walls extend in a helix-configuration. This helix embodiment provides an improved flow angle and shorter axial length.) The walls of the PD chambers 10 may be curved (helix) along the entire length of the pulse detonation assembly 100 and/or curved (lobed) only along a downstream portion thereof (transition piece) for enhanced mixing of the bypass flow and detonation products and/or improved initial flow angle.

Figure 10:
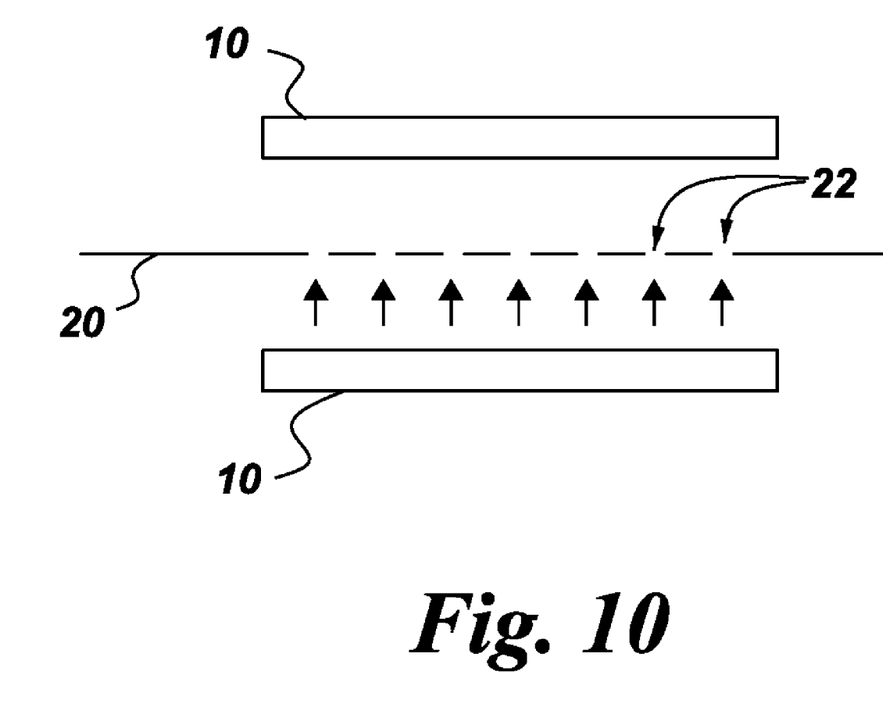
FIG. 10 illustrates pressure equalization between neighboring segments of the pulse detonation assembly or hybrid engine via a number of ports.

The barriers 20 can be configured for fluid communication between neighboring sectors 30, as indicated for example in FIG. 10. For this embodiment, a number of the sectors 30 further include fluid communication ports 22 configured for permitting a fluid flow between sectors 30. Exemplary fluid communication ports 22 include small holes 22 (for example, on the order of 0.030 inches in diameter) formed in the barriers 20 that permit fluid to flow between the respective sectors 30 in order to permit pressure-equalization while minimizing adverse shock cross-interactions. 0.030 inches corresponds to a minimum film cooling hole size because smaller holes could be subject to clogging by solid particles. Exemplary holes 22 are illustrated in FIG. 10. For this embodiment, the holes 22 should be sufficiently small such that the sectors 30 are effectively isolated with respect to the pulse detonation process. However, the holes should be sufficiently large to provide pressure balancing between sectors 30. The holes 22 may be evenly distributed or may be located only at those portions of the sectors 30 that require the greatest pressure balancing. The holes may be regularly or irregularly shaped and may be regularly or irregularly spaced. Beneficially, this pressure balancing provides more uniformity to the downstream unit (turbine) as well as reducing noise and local stresses. In one example embodiment, about two to ten percent (2-10%) of the barrier area is composed of holes. Alternatively, larger holes with valves could be employed to permit fluid flow between sectors 30 as needed to correct pressure imbalances between the segments 30. Valves for this application should be fast acting, on the order of a millisecond or less, which is the timescale for the pressure variations. According to a more particular example, the fluid communication ports 22 are distributed toward the aft end of the sectors 30.

The above described pulse detonation assembly 100 is advantageously combined with a turbine assembly that includes one or more turbine stages to form a hybrid pulse detonation-turbine engine. Each turbine stage typically includes a stationary turbine nozzle and a set of rotating turbine blades. In a particular embodiment, the stationary turbine nozzle is configured to direct the flow to the rotating turbine blades at an angle relative to the axial direction. For the exemplary embodiment illustrated by FIGS. 3 and 4, a hybrid engine 110 includes a number of pulse detonation chambers 10, which are adapted to expel respective detonation product streams, and a number of barriers 20. Each of the barriers 20 is disposed between a respective pair of the pulse detonation chambers 10. The barriers 20 define, at least in part, a number of sectors 30, where each of the sectors 30 contains at least one of the pulse detonation chambers 10, as indicated for example in FIG. 4. Exemplary barriers 20 are described above. The hybrid engine 110 further includes a turbine assembly 80 that includes at least one turbine stage 82 and is in flow communication with the pulse detonation chambers 10. The turbine assembly 80 is configured to be at least partially driven by the detonation product streams from the pulse detonation chambers 10. For example a turbine disk 84, which is indicated in FIGS. 3 and 4, receives the detonation products from the pulse detonation chambers 10.

Figure 3:
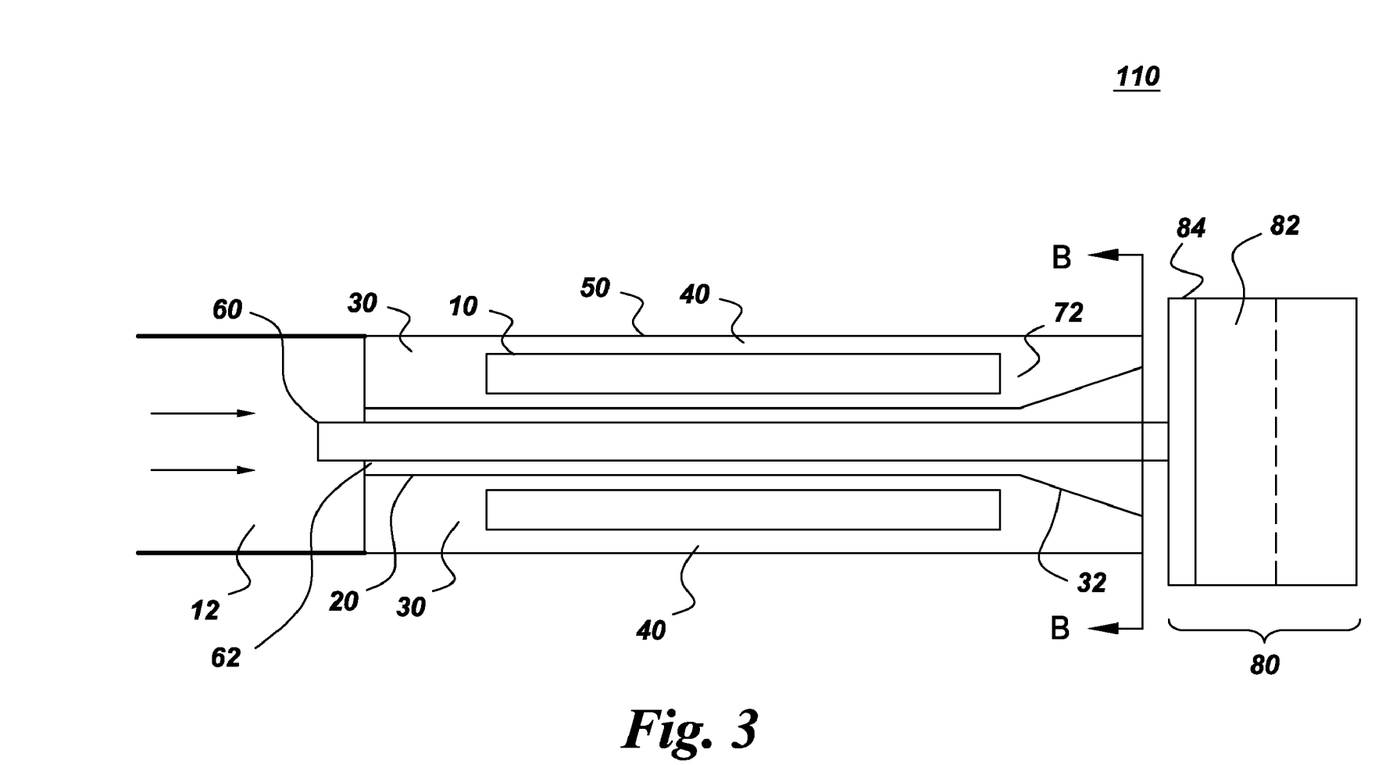
FIG. 3 illustrates an exemplary hybrid engine embodiment of the invention.
Figure 4:
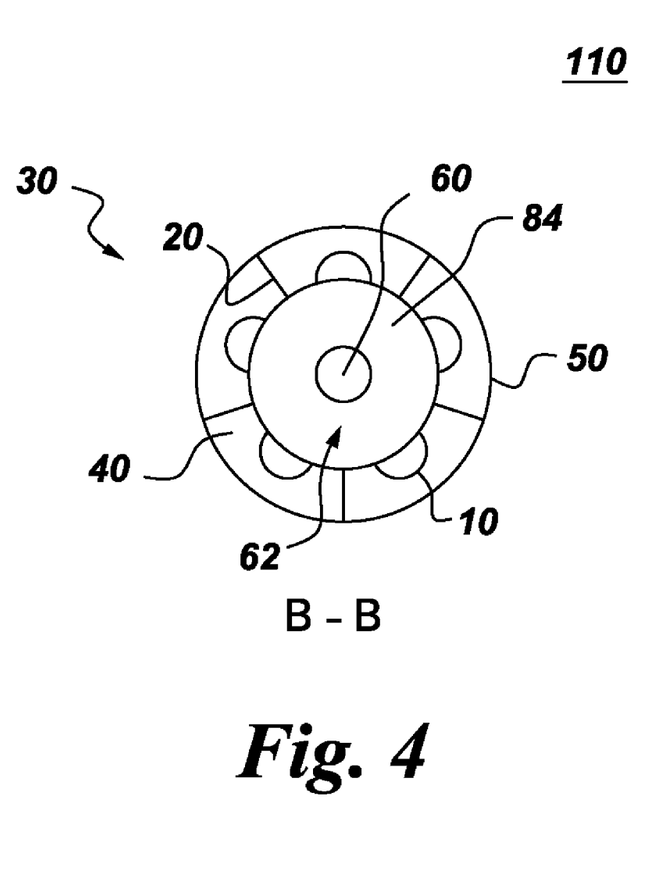
FIG. 4 is a cross-sectional view of the hybrid engine of FIG. 3 taken along the line B-B.

For the exemplary embodiment depicted in FIGS. 3 and 4, the hybrid engine 110 further includes a casing 50, and the pulse detonation chambers 10 are arranged in an annular configuration that defines a central region 62. The hybrid engine 110 further includes a shaft 60 positioned in the central region 62, and each of the barriers 20 extends between the shaft 60 and the casing 50. For the exemplary embodiments shown in FIGS. 3 and 4, each of the sectors 30 contains one pulse detonation chamber 10. However, for another embodiment (not shown), at least one of the sectors 30 contains at least two pulse detonation chambers 10. For the exemplary embodiment of FIGS. 3 and 4, the shaft 60 is configured to connect a compressor with a turbine. In alternate engine configurations, the compressor and turbine could be to one side of the pulse detonation chambers 10.

For the exemplary embodiment depicted in FIG. 3, the hybrid engine 110 further includes a number of segments 32. Each of the segments 32 is configured to receive and direct the detonation product stream from a respective one of the pulse detonation chambers 10. For the particular embodiment shown in FIG. 3, each of the sectors 30 comprises a respective one of the segments 32. For the exemplary embodiment shown in FIG. 11, each of the segments 32 is attached to a respective one of the pulse detonation chambers 10.

As indicated for example in FIGS. 3 and 4, each of the sectors 30 defines a respective bypass region 40 adapted to receive and conduct a bypass flow. To mix the detonation products with the bypass flows, segments 32, which are indicated in FIG. 3, may be employed. As discussed above with reference to FIG. 1, each of the segments 32 includes a respective mixing zone 72, which is adapted to receive and mix the detonation product streams and the bypass flows from the sectors 30 to form a segment exhaust flow. For the exemplary embodiment illustrated in FIG. 3, each of the sectors 30 has a segment 32 in the form of a shaped end-piece, which is adapted to direct the exhaust flow toward a first rotating stage 82 of the turbine assembly 80. For the exemplary embodiment depicted in FIG. 11, each of the segments 32 is attached to a respective one of the pulse detonation chambers 10.

For the exemplary embodiment of FIG. 3, the hybrid engine 110 further includes a plenum 12 configured to supply a primary air flow to the pulse detonation chambers 10 and the bypass flow to the bypass regions 40. As noted above, one benefit of this common plenum 12 configuration is the equal flow distribution between the bypass and core regions.

Figure 8:
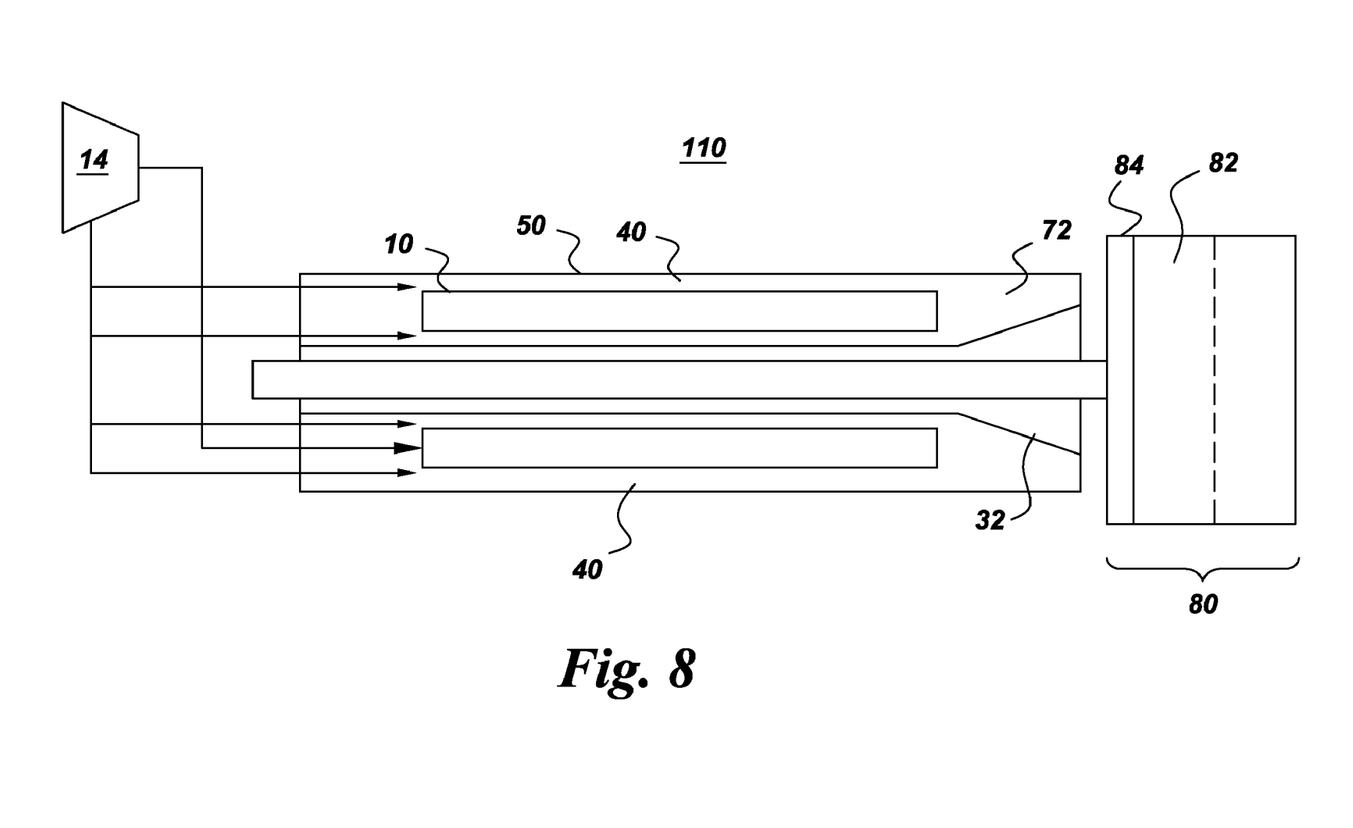
FIG. 8 shows the hybrid engine of FIG. 3 with a compressor to supply both the primary and bypass air flows.

For the exemplary embodiment shown in FIG. 8, the hybrid engine 110 further includes a compressor 14, for example, a boost compressor, configured to supply a primary air flow to the pulse detonation chambers 10 and to supply the bypass flow to bypass regions 40. As noted above, the boost compressor 14 can be used to modulate the bypass flow for additional cooling of the pulse detonation assembly 100 and/or turbine stages 82 or to provide additional airflow to the turbine assembly 80, as needed. According to another embodiment, different sources supply the air flow to the core and bypass regions.

As indicated in FIG. 4, the PD chamber 10 walls are straight for certain embodiments. For the exemplary embodiment illustrated by FIG. 9, however, the PD chamber walls are curved. The curved PD chamber walls are discussed above with reference to FIGS. 9 and 12.

As discussed above with respect to FIG. 10, the barriers 20 can be configured for fluid communication between neighboring sectors 30. For this embodiment, a number of sectors 30 further include fluid communication ports 22 configured for permitting a fluid flow between the sectors 30. Exemplary fluid communication ports 22 are discussed above. Exemplary holes 22 are illustrated in FIG. 10.

Figure 11:
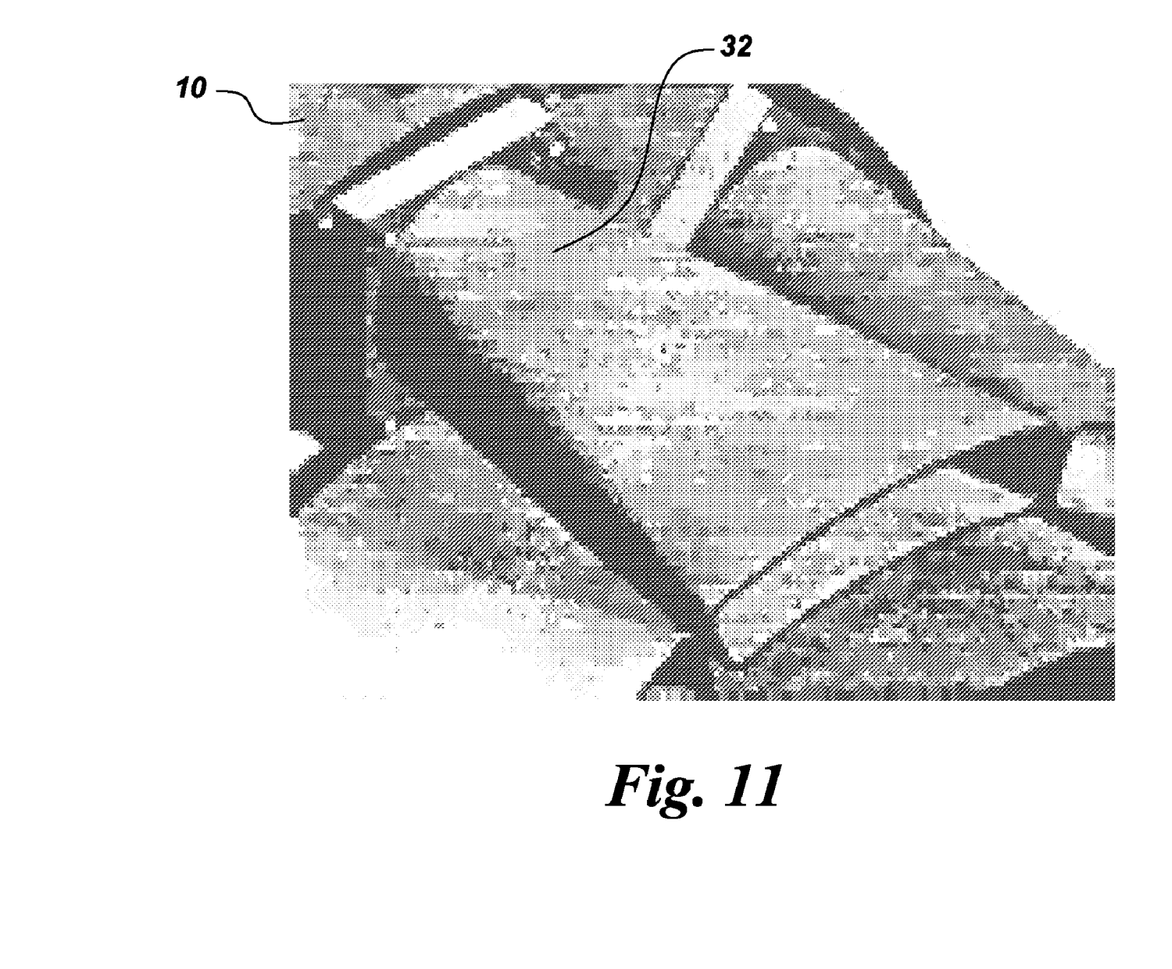
FIG. 11 shows an exemplary pulse detonation assembly embodiment of the invention, with segments attached to the pulse detonation chambers.

A segmented hybrid engine embodiment of the invention is described with reference to FIGS. 3 and 11. As shown, for example, in FIG. 11, the segmented hybrid engine includes a number of pulse detonation chambers 10. Each of the pulse detonation chambers 10 is adapted to expel a respective detonation product stream. As indicated in FIG. 11, for example, the segmented hybrid engine further includes a number of segments 32. Each of the segments is configured to receive and direct the detonation product stream from a respective one of the pulse detonation chambers 10. As shown, for example in FIG. 3, the segmented hybrid engine further includes a turbine assembly 80, which includes at least one turbine stage 82 and is in flow communication with the pulse detonation chambers 10. The turbine assembly 82 is configured to be at least partially driven by the detonation product streams from the pulse detonation chambers 10. For the exemplary embodiment shown in FIG. 11, each of the segments 32 is attached to a respective one of the pulse detonation chambers 10. For the exemplary embodiment shown in FIG. 7, each of the pulse detonation chambers 10 has a coaxial wall structure comprising an inner and an outer wall 42, 44, which define a respective coaxial bypass region 41 adapted to receive and conduct a bypass flow. For this embodiment, each of the segments 32 discussed above with reference to FIG. 11 is adapted to receive and mix the detonation product stream and the bypass flow from the respective pulse detonation chamber 10 and coaxial bypass region 20. For a particular embodiment, the segments 32 are configured to direct the flow to a downstream work extraction device (turbine) axially. For another embodiment, the segments 32 are configured to direct the flow to a downstream work extraction device (turbine) at an angle relative to the axial direction. For example, the angle can be typical of that achieved by turbine nozzles. For example, some turbine nozzles achieve flow direction angles on the order of 60-70 degrees.

Figure 12:
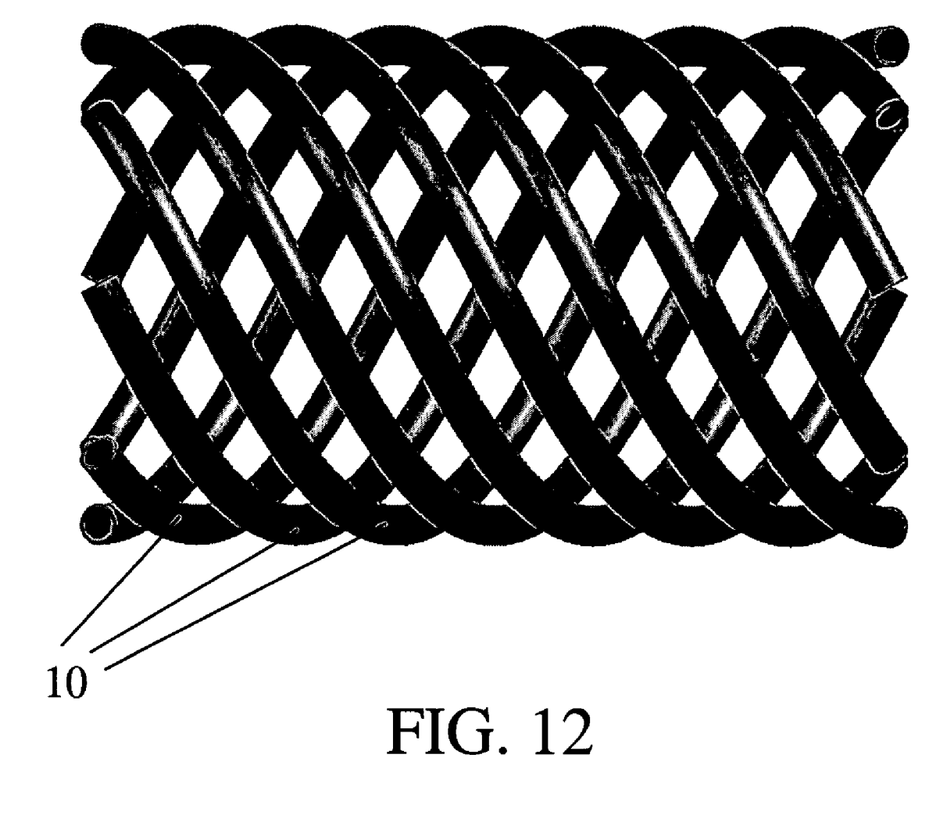
FIG. 12 shows an exemplary embodiment of the invention with the pulse detonation chambers arranged in a helix-configuration.

Although the tube arrangement is shown as axial in FIG. 11, the tubes 10 may be arranged (curved) in a helix-arrangement, as shown for example in FIG. 12. According to a particular embodiment, the tubes 10 are arranged in a 45 degree helix. Beneficially, the helix-configuration provides a shorter pulse detonation assembly, as well as an improved initial flow angle.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A pulse detonation assembly comprising:
   a casing;
   a plurality of pulse detonation chambers disposed within said casing, each of said plurality of pulse detonation chambers adapted to receive and combust a primary air flow and to expel a respective detonation product stream; and
   a plurality of barriers extending in an axial direction along a length of said pulse detonation chambers and in a radial direction between a central region and the casing defining, at least in part, a plurality of sectors, each of said sectors containing at least one of said plurality of pulse detonation chambers and defining a respective bypass region adapted to receive and conduct a bypass flow; and
   a plurality of segments, each segment including a mixing zone adapted to receive and mix a respective detonation product stream from said plurality of pulse detonation chambers with the bypass flow from a respective sector to form a segment exhaust flow.

2. The pulse detonation assembly of claim 1, wherein said pulse detonation chambers are arranged in an annular configuration.

3. The pulse detonation assembly of claim 1, further comprising a shaft positioned in said central region, wherein each of said barriers extends between said shaft and said casing.

4. The pulse detonation assembly of claim 1, wherein at least one of said sectors contains at least two of said pulse detonation chambers.

5. The pulse detonation assembly of claim 1, further comprising a plenum configured to supply the primary air flow to said pulse detonation chambers and the bypass flow to said bypass regions.

6. The pulse detonation assembly of claim 1, further comprising a compressor configured to supply the primary air flow to said pulse detonation chambers and to supply the bypass flow to said bypass regions.

7. The pulse detonation assembly of claim 1, wherein said pulse detonation chambers are curved.

8. The pulse detonation assembly of claim 1, wherein a plurality of said segments further comprise fluid communication ports configured for permitting a fluid flow between said segments.

9. The pulse detonation assembly of claim 1, wherein each of said pulse detonation chambers has a coaxial wall structure comprising an inner and an outer wall, and wherein said inner wall and outer wall define a respective coaxial bypass region adapted to receive and conduct a bypass flow.

10. A hybrid engine comprising:
    a pulse detonation assembly comprising a casing; a plurality of pulse detonation chambers, wherein each of said pulse detonation chambers is adapted to receive and combust a primary air flow and to expel a respective detonation product stream;

a plurality of barriers extending in an axial direction along a length of said pulse detonation chambers and in a radial direction between a central region and the casing defining, at least in part, a plurality of sectors, each of said sectors containing at least one of said plurality of pulse detonation chambers and defining a respective bypass region adapted to receive and conduct a bypass flow; and a plurality of segments, each segment including a mixing zone adapted to receive and mix a respective detonation product stream from said plurality of pulse detonation chambers with the bypass flow from a respective sector to form a segment exhaust flow; and a turbine assembly comprising at least one turbine stage configured to be at least partially driven by the segment exhaust flow.

11. The hybrid engine of claim 10, further comprising:
wherein said pulse detonation chambers are arranged in an annular configuration; and
a shaft positioned in said central region.

12. The hybrid engine of claim 10, wherein at least one of said sectors contains at least two of said pulse detonation chambers.

13. The pulse detonation assembly of claim 10, further comprising a plenum configured to supply the primary air flow to said pulse detonation chambers and the bypass flow to said bypass regions.

14. The hybrid engine of claim 10, further comprising a compressor configured to supply the primary air flow to said pulse detonation chambers and the bypass flow to said bypass regions.

15. The hybrid engine of claim 10, wherein said pulse detonation chambers are curved.

16. The hybrid engine of claim 15, wherein said pulse detonation chambers are arranged in a helix-configuration.

17. The hybrid engine of claim 15, wherein said pulse detonation chambers are lobed in a transition region.

18. The hybrid engine of claim 10, wherein at least one barrier includes a fluid communication port configured for permitting a fluid flow between said sectors.

19. The hybrid engine of claim 10, wherein each of said pulse detonation chambers has a coaxial wall structure comprising an inner and an outer wall, and wherein said inner wall and outer wall define a respective coaxial bypass region adapted to receive and conduct the bypass flow.

20. The pulse detonation assembly of claim 1, wherein said plurality of barriers are made of a high-temperature material.

21. The pulse detonation assembly of claim 20, wherein said high-temperature material is selected from the group consisting of nickel alloy metals and ceramic matrix composites.

22. The pulse detonation assembly of claim 1, wherein each of said plurality of barriers comprises a single wall or multi-wall structure and further comprises at least one coating.

23. The hybrid engine of claim 10, wherein said plurality of barrier is made of a high-temperature material.

24. The hybrid engine of claim 23, wherein said high-temperature material is selected from the group consisting of nickel alloy metals and ceramic matrix composites.

25. The hybrid engine of claim 10, wherein each of said plurality of barriers comprises a single wall or multi-wall structure and further comprises at least one coating.

* * * * *